(12) United States Patent
Berk et al.

(10) Patent No.: US 9,505,521 B2
(45) Date of Patent: Nov. 29, 2016

(54) BIODEGRADABLE BOTTLE FOR LIQUIDS

(75) Inventors: Adam Berk, Boca Raton, FL (US); Lee Green, Boca Raton, FL (US); Fuad Khan, Cardiff CF (GB)

(73) Assignee: LGAB LLC, Boca Raton, FL (US)

( * ) Notice: Subject to any disclaimer, the term of this patent is extended or adjusted under 35 U.S.C. 154(b) by 167 days.

(21) Appl. No.: 13/553,474

(22) Filed: Jul. 19, 2012

(65) Prior Publication Data

US 2013/0020277 A1 Jan. 24, 2013

Related U.S. Application Data

(60) Provisional application No. 61/509,482, filed on Jul. 19, 2011, provisional application No. 61/509,858, filed on Jul. 20, 2011.

(51) Int. Cl.
*B65D 8/00* (2006.01)
*B65D 6/38* (2006.01)
*B65D 65/46* (2006.01)

(52) U.S. Cl.
CPC ............ *B65D 11/04* (2013.01); *B65D 11/24* (2013.01); *B65D 15/02* (2013.01); *B65D 15/20* (2013.01); *B65D 65/466* (2013.01); *Y02W 90/11* (2015.05); *Y02W 90/12* (2015.05); *Y02W 90/13* (2015.05)

(58) Field of Classification Search
CPC ...... B65D 51/18; B65D 51/24; B65D 11/04; B65D 15/00; Y02W 90/11–90/13
USPC ............... 215/379, 44, 43, 228; 220/256.1; 493/93
See application file for complete search history.

(56) References Cited

U.S. PATENT DOCUMENTS

| | | | |
|---|---|---|---|
| 5,704,503 A | 1/1998 | Krishnakumar et al. | |
| 6,139,665 A | 10/2000 | Schmelzer et al. | |
| 7,048,975 B1 | 5/2006 | Tojo et al. | |
| 7,380,680 B2 * | 6/2008 | Kosmyna | B05B 7/2478 220/23.87 |
| 2008/0044603 A1 | 2/2008 | Hutchinson et al. | |
| 2010/0084361 A1 * | 4/2010 | Dayton | B31B 43/00 215/40 |
| 2010/0230405 A1 | 9/2010 | Strait, III | |

FOREIGN PATENT DOCUMENTS

| | | |
|---|---|---|
| WO | 03086881 A1 | 10/2003 |
| WO | 2006031172 A1 | 3/2006 |
| WO | 2010054334 A2 | 5/2010 |
| WO | 2010105076 | 9/2010 |

OTHER PUBLICATIONS

Supplementary European Search Report for EP Application No. 12814617.2 dated Aug. 11, 2015.
International Application No. PCT/US2012/047438, International Search Report, dated Oct. 16, 2012, 3 pages.
International Application No. PCT/US2012/047438, Written Opinion, dated Oct. 16, 2012, 6 pages.

\* cited by examiner

*Primary Examiner* — Anthony Stashick
*Assistant Examiner* — Raven Collins
(74) *Attorney, Agent, or Firm* — Buchanan Ingersoll & Rooney

(57) ABSTRACT

A bottle for holding liquids that is biodegradable and that is made from environmentally sustainable materials. The bottle includes a body, a shoulder, a neck portion, and a cap. According to one aspect, the neck portion of the bottle is made of bioplastic, and the shoulder and body of the bottle are made from thermoformed pulp. The bioplastic neck can mate with, and be adhered to, the shoulder, and the shoulder can mate with, and be adhered to, the pulp body.

16 Claims, 12 Drawing Sheets

BIODEGRADABLE BOTTLE FOR LIQUIDS

CROSS REFERENCE TO RELATED APPLICATIONS

This application claims the benefit of U.S. Provisional Application No. 61/509,482, entitled "Biodegradable Bottle for Liquids" and filed Jul. 19, 2011, and U.S. Provisional Application No. 61/509,858, entitled "Biodegradable Bottle for Liquids" and filed Jul. 20, 2011, the contents of which are incorporated herein by reference.

FIELD OF THE INVENTION

The present invention relates to an apparatus for storing liquids and, more specifically, to a bottle for liquids, which bottle is biodegradable and manufactured from environmentally sustainable materials.

BACKGROUND OF THE INVENTION

Conventional bottles for liquids are typically made of petroleum-based plastics. Reacting to the rising cost of petroleum-based plastics, manufacturers of conventional plastic bottles have been making bottles thinner in recent years. This trend is predicted to continue for the foreseeable future. Meanwhile, the price of pulp products having certain strength and performance attributes has stayed relatively stable. As conventional petroleum-based plastic bottles have been made thinner, their performance as measured by static load and compressive strength has often been compromised. Petroleum-based plastics also have a larger carbon footprint than pulp and bioplastics, as petroleum-based plastics typically do not biodegrade, while both pulp and bioplastics do. Further, pulp and bioplastics are made from environmentally sustainable resources, and the former can be recycled easily.

There have been many recent efforts to develop biodegradable bottles having potential to address problems relating to the cost, performance, and environmental impact of conventional bottles. The most common biodegradable bottles are made from bioplastics, particularly polylactic acid (PLA). These bottles are relatively expensive, and in some respects, PLA bottles do not perform as well as pulp-based bottles.

U.S. Pat. Nos. 5,385,764 and 5,705,237 relate to a container incorporating a hydraulically settable structural matrix including a hydraulically settable binder such as cement for use in the storing, dispensing, and/or packing of food and beverage products. Disposable containers and cups are those that are particularly useful for dispensing hot and cold food and beverages in a fast food restaurant industry.

U.S. Pat. No. 6,899,793 relates to a method of manufacturing a pulp mold formed body. The method feeds a pulp slurry to a cavity of a paper making mold having a prescribed cavity shape to form a pulp pre-form including a main part having an opening and a separate part having a flange and connected to an edge of the opening. A pressing member is inserted into the pre-form; the pressing member is expanded to press the pre-form toward the paper making surface; the pre-form is removed from the paper making mold; and then the pre-form is cut at a joint between the separable part and the main part.

U.S. Pat. No. 7,048,975 relates to a pulp molded container comprising a pulp molded article having, on the inner surface and/or the outer surface, a resin with the thickness of 5-300 µm formed by applying a coating. The thickness ratio of the resin layer to the molded article is ½ to ¹/₁₀₀, and the surface roughness profile of the outer or inner surface of the pulp molded article is such that a center line average roughness is 0.5 to 20 µm.

U.S. Patent App. Pub. No. US 2010/0200591 (published Aug. 12, 2010), and a product manufactured by the assignee of such patent application (Greenbottle), provide a composite of pulp and a polyethylene terephthalate (PET) bladder, where the end user separates the bladder from the pulp at end of use and recycles them in their respective streams. However, if a user left the whole bottle to biodegrade it would not do so due to its PET bladder.

While there have been attempts in the prior art to address the problems relating to cost, performance, and environmental impact of bottles, there remains a need for new solutions to address these issues with greater efficacy.

SUMMARY OF THE INVENTION

According to one aspect of the present invention, there is provided a bottle that is biodegradable and that is made from sustainable materials. In one embodiment, the bottle comprises three parts: a neck section, a shoulder section, and a body section. The bottle may be made for a single use.

In an exemplary embodiment, the neck section, which contains a flange and threads for sealing, is made from a biodegradable bioplastic. A bioplastic neck allows for better performance by the flange and threads than typical pulp-formed versions of the neck; however the neck section could be made from thermoformed pulp. The shoulder and body sections are made from thermoformed pulp. The bottle may be molded in multiple parts and joined at one or more seams with an adhesive. The strength of the bond may be smooth and non porous as bioplastic. The adhesive may be a water-based, food safe compound.

According to another aspect of the present invention, the bottle has a biodegradable lining. The neck section may have a cap closure at its top. The cap may be made from the same material as the bottle neck. The cap may screw onto the top of the container.

According to another aspect of the present invention, the bottle may be used for the storage and consumption of beverages including water, juices, sports and energy drinks. As such, the bottle may be a container of a size to hold twelve ounces of liquid, or any other convenient volume of liquid. In certain embodiments, the bottle may include an adhesive that may be FDA approved for use in connection with human consumption. Alternatively, in other embodiments, the bottle may be used for inedible products such as detergents, solvents, and oil-based products. The adhesive and the lining inside the bottle may vary as appropriate for the particular liquid contained within the bottle.

In an embodiment, the bottle may have the look of conventional plastic bottles that are currently on the market today. As such, the bottle may have an area to be used as a label area for attaching a label. When used as a bottle for beverages, the bottle may have a similar neck design to existing beverage bottles, including a neck with a flange below the threads where a top is screwed on.

The bottle may have similar overall look or dimensions as conventional plastic bottles for ease in utilizing existing manufacturing, distribution, and retail channels, as well as to appeal to consumers, but the bottle may have certain distinguishing features that set it apart from conventional plastic bottles. The bottle may be designed to be filled on a standard production line so that it can be integrated into an existing production line.

The bottling environment may rely on holding and controlling the bottle by the neck flange beneath the cap. The bottle may rest on this flange as it is transported through the various processes of bottling which include initial cleaning/rinsing, labeling, filling and capping. The bottle may be inverted to drain after rinsing or clamped to prevent rotation as the cap and seal are twisted on; both are done by manipulating the flange.

The bottle of the present invention exceeds the strength and capabilities of the latest PET(polyethylene)/PLA (poly lactic acid) bottles. Recently other bottles made of petroleum-based plastic have had several weight reductions over time to reduce cost and address environmental concerns. These weight reductions have made the bottles quite weak. In the packing stage of the bottling process, the bottles of the current invention may be placed on a pallet in layers. A pallet may be loaded six layers high. Each layer may be separated by a corrugated cardboard separator sheet, and the complete cube may then be shrink-wrapped. The palletized bottles may then be double stacked on a trailer. The maximum static load on a bottle is 11 bottles plus the proportional weight of the upper pallet; this is a bottle on the bottom layer of the lower pallet.

Thus, the pulp hybrid, by virtue of being stronger, is able to endure the same or harsher environment than its plastic counterparts.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

The present invention relates to a bottle which can be used in the storage, transportation, and consumption or use of liquids, said bottle being biodegradable and manufactured from environmentally sustainable materials.

Figure 1:
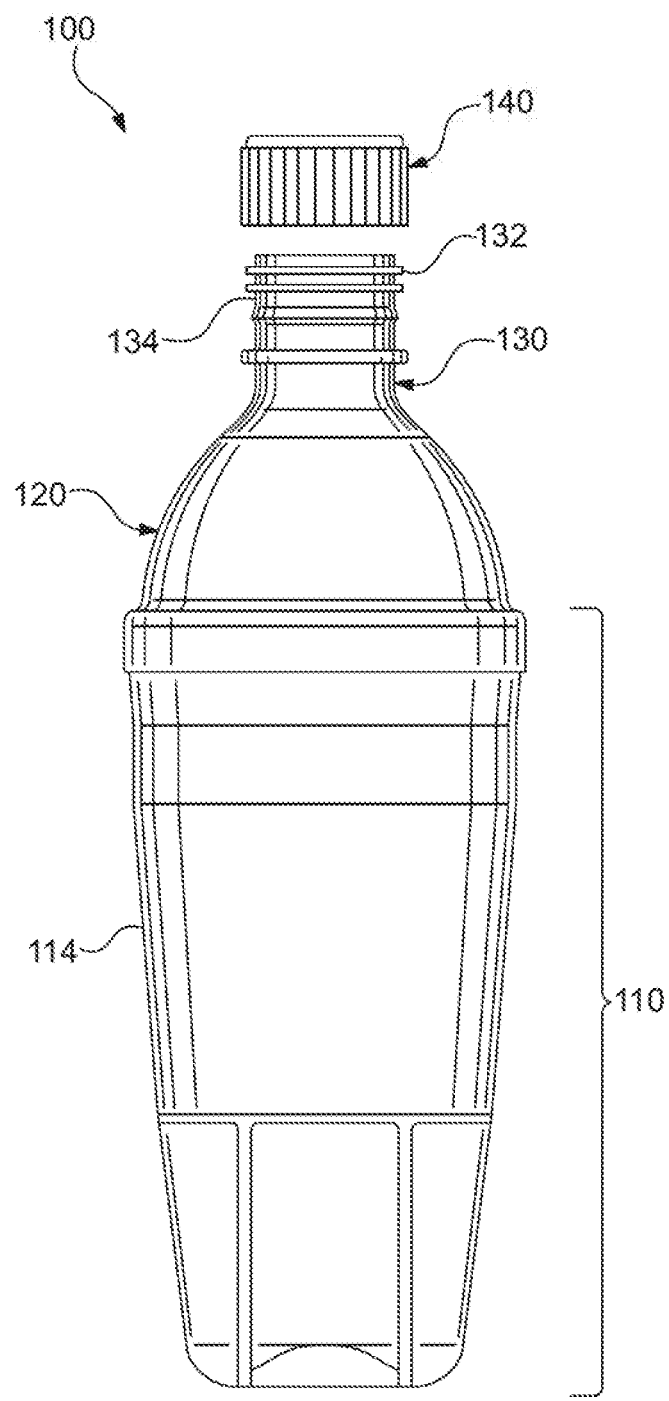
FIG. 1 is a side plan view of an exemplary embodiment of a bottle, in accordance with an exemplary embodiment of the present invention.

Referring now to FIG. 1, there is illustrated an exemplary embodiment of an apparatus, generally designated as 100, for storing liquids, in accordance with an exemplary embodiment of the present invention. In the exemplary embodiment illustrated, the apparatus 100 is a bottle. It is to be understood that the apparatus 100 may be any apparatus or container for storing liquids.

The bottle 100 comprises a body 110, a shoulder 120, a neck 130, and a cap 140. The cap 140 of the bottle 100 assists in sealing the contents of the bottle 100 until the bottle 100 is opened. In the exemplary embodiment illustrated in FIG. 1, the neck 130 includes exterior threading 132 on its upper portion 134 for receiving the cap 140. It is to be understood that the bottle 100 is not limited to including exterior threading 132 and that the cap 140 of the bottle 100 can also be secured through other means known to one skilled in the art.

Figure 2:
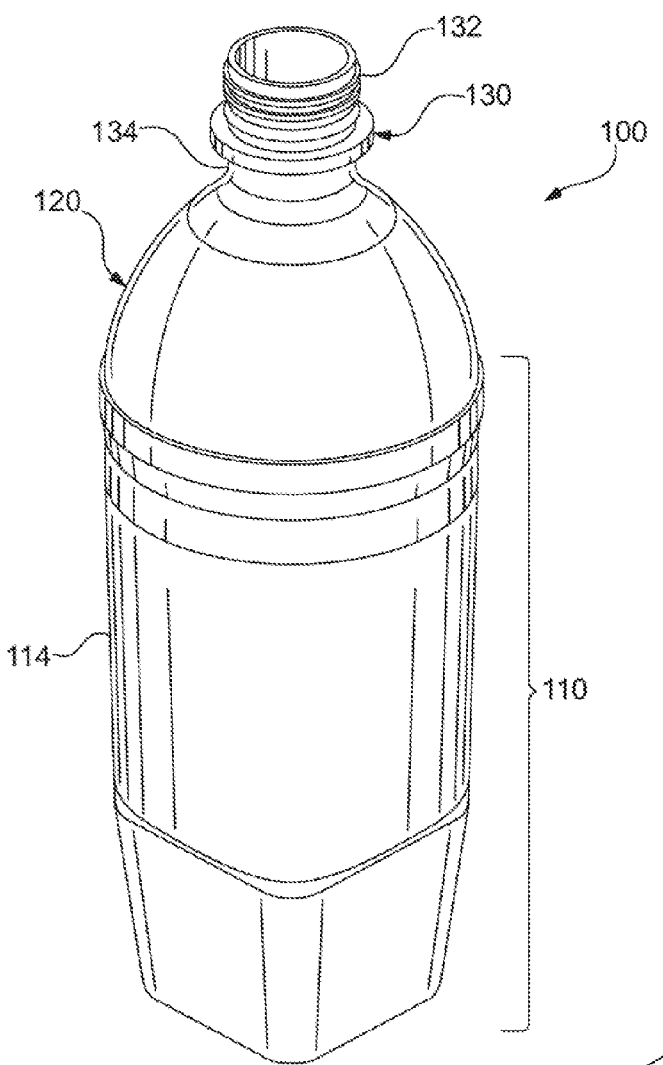
FIG. 2 is a perspective skeleton view of the bottle illustrated in FIG. 1, in accordance with an exemplary embodiment of the present invention.
Figure 3:
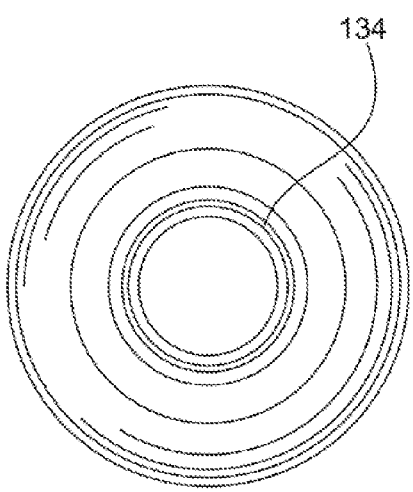
FIG. 3 is a plan skeleton view of a bottom of the bottle illustrated in FIG. 1, in accordance with an exemplary embodiment of the present invention.

FIG. 2 illustrates a perspective skeleton view of the bottle 100, and FIG. 3 illustrates a plan skeleton view of a bottom of the bottle 100, in accordance with an exemplary embodiment of the present invention. The body 110 of the bottle 100 may comprise a smooth surface area 114 (best seen in FIGS. 1 and 2) for applying a label. It is to be understood that although FIGS. 1 and 2 illustrate that the surface area 114 is smooth, other embodiments in which the surface area 114 is not smooth are contemplated.

Figures 4, 5:
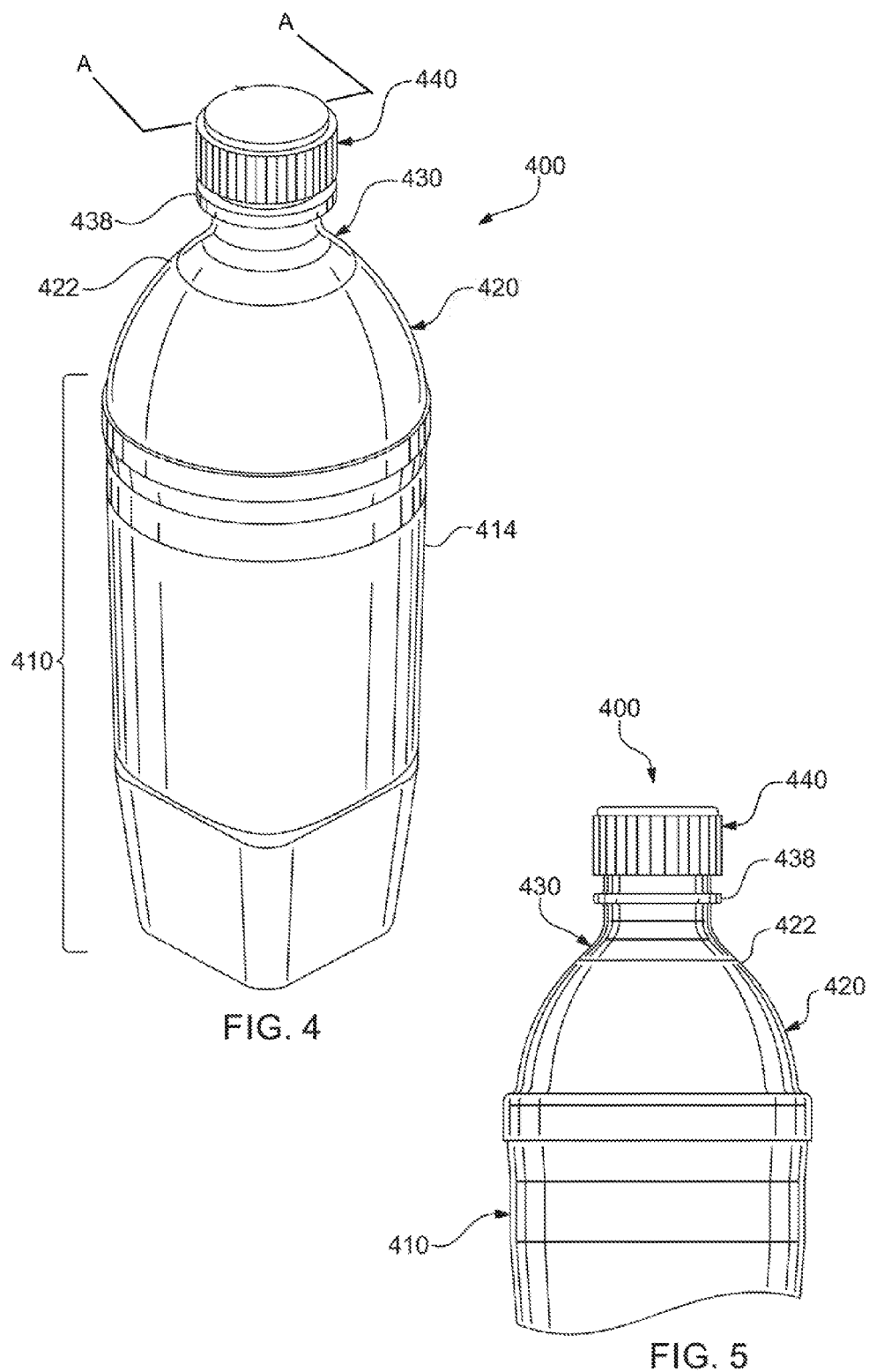
FIG. 4 is a perspective view of another exemplary embodiment of a bottle, in accordance with an exemplary embodiment of the present invention.
FIG. 5 is a side plan view of a top of the bottle illustrated in FIG. 4, in accordance with an exemplary embodiment of the present invention.

In an exemplary embodiment of the bottle 100, the body 110 and shoulder 120 are constructed of pulp, and the neck 130 and cap 140 are formed from bioplastic. Illustrated in FIG. 4 is such an exemplary embodiment of the bottle 100, generally designated as 400, in accordance with an exemplary embodiment of the present invention. Specifically, FIG. 4 illustrates a perspective view of the bottle 400. Illustrated in FIG. 5 is a side plan view of a top portion of the bottle 400, and illustrated in FIG. 6 is an exploded view of the bottle 400.

Figure 6:
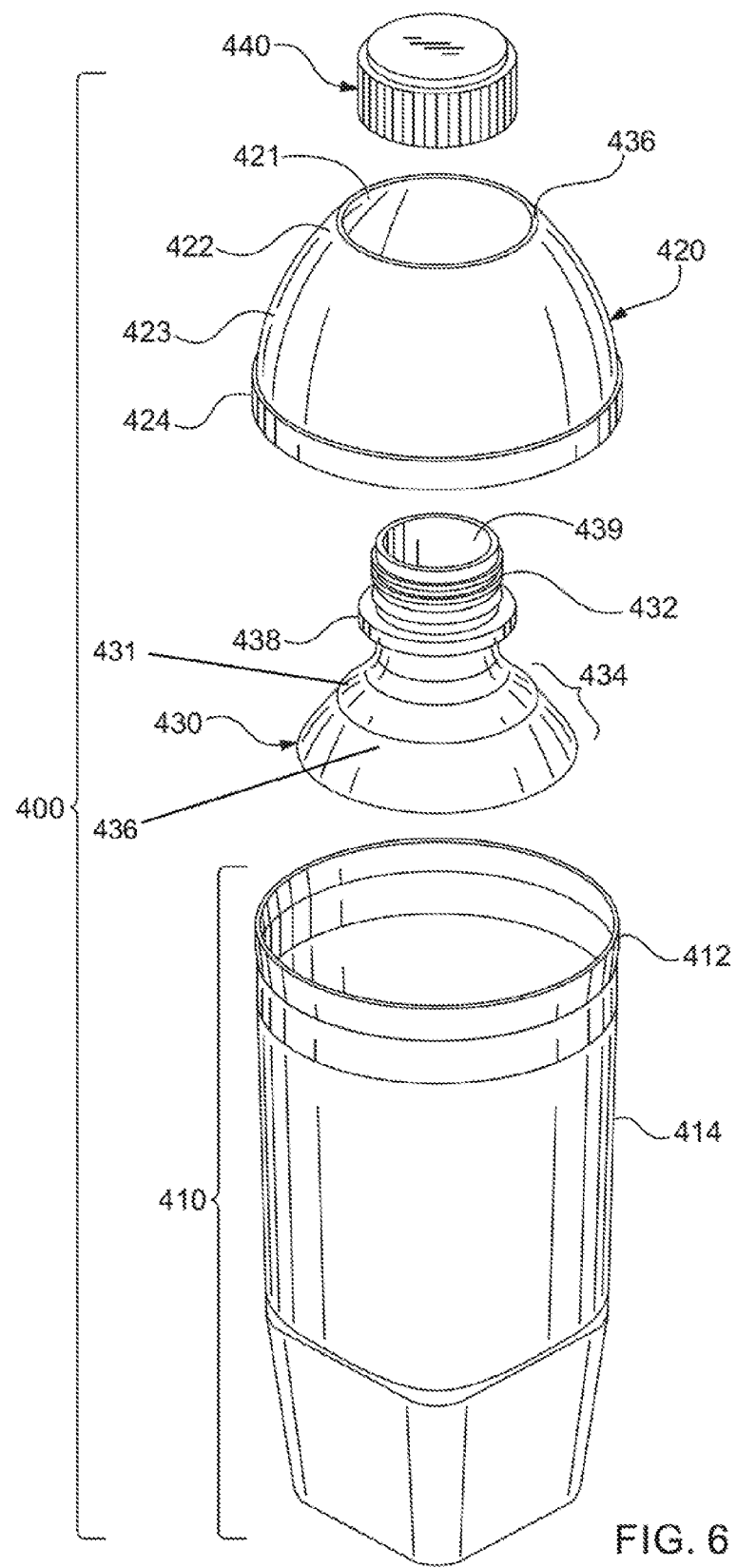
FIG. 6 is an exploded view of the bottle illustrated in FIG. 4, in accordance with an exemplary embodiment of the present invention.

Referring to FIGS. 4-6 together, the bottle 400 comprises a pulp body 410, a pulp shoulder 420, a bioplastic neck portion 430, and a bioplastic cap 440. The pulp body 410 can be of any shape known to one skilled in the art to be suitable for storing liquid contents. The pulp body 410 is generally tapered, as shown in the figure, to facilitate removal during a molding process, and its base may have the shape of a rounded square to provide strength.

The pulp shoulder 420 comprises an opening 422 at its top and a vertical lip 424 at its bottom. The pulp shoulder has a generally dome-like shape. The bioplastic neck portion 430 includes a neck 432 attached to a bottom portion 434. The neck 432 includes a neck flange 438. The bottom portion 434 comprises a ridge 436 and has a dome-like, or conical or square, shape. The portion of the dome-like shape of the neck portion 430 below the ridge 436 generally matches the dome-like shape of the pulp shoulder 420. The pulp shoulder 420 comprises an inner surface 421 and an outer surface 423, and the bioplastic neck portion 430 comprises an inner surface 431 and an outer surface 433. Thus, the outer surface 433 of the portion of the neck portion 430 below the ridge 436 matches the outer surface 423 of the pulp shoulder 420 adjacent to the opening 422 so that the top edge of the opening 422 of the pulp shoulder abuts against the ridge 436 of the neck portion 430. The matching in shapes of the outer surfaces 433, 423 of the respective portions of the neck portion 430 below the ridge 436 and of the pulp shoulder 420 provides for a smooth exterior surface of the bottle 400 in the area about the ridge 436 upon joining the bioplastic neck portion 430 and pulp shoulder 420, as the outer surfaces 433, 423 of the respective bioplastic neck portion 430 and pulp shoulder 420 on either side of the ridge 436 smoothly transitions from one to another.

The bioplastic neck flange 438 is cylindrical and extends radially from the top portion of the bioplastic neck portion 430. In one embodiment, illustrated in FIGS. 4-6 and in further detail in FIG. 7, which illustrates a portion of a cross section of the bottle 400 taken along a line A-A illustrated in FIG. 4, the pulp shoulder 420 is placed over the bioplastic neck portion 430, and the neck 432 extends through the opening 422 of the pulp shoulder 420. The neck 432 has exterior threading 439 along the top portion of its circumference for receiving the cap 440. It is to be understood that the cap 440 of the bottle 400 can also be secured through other means known to one skilled in the art. The body 410 of the bottle 400 may also includes a smooth surface 414 onto which a label may be placed.

Figure 7:
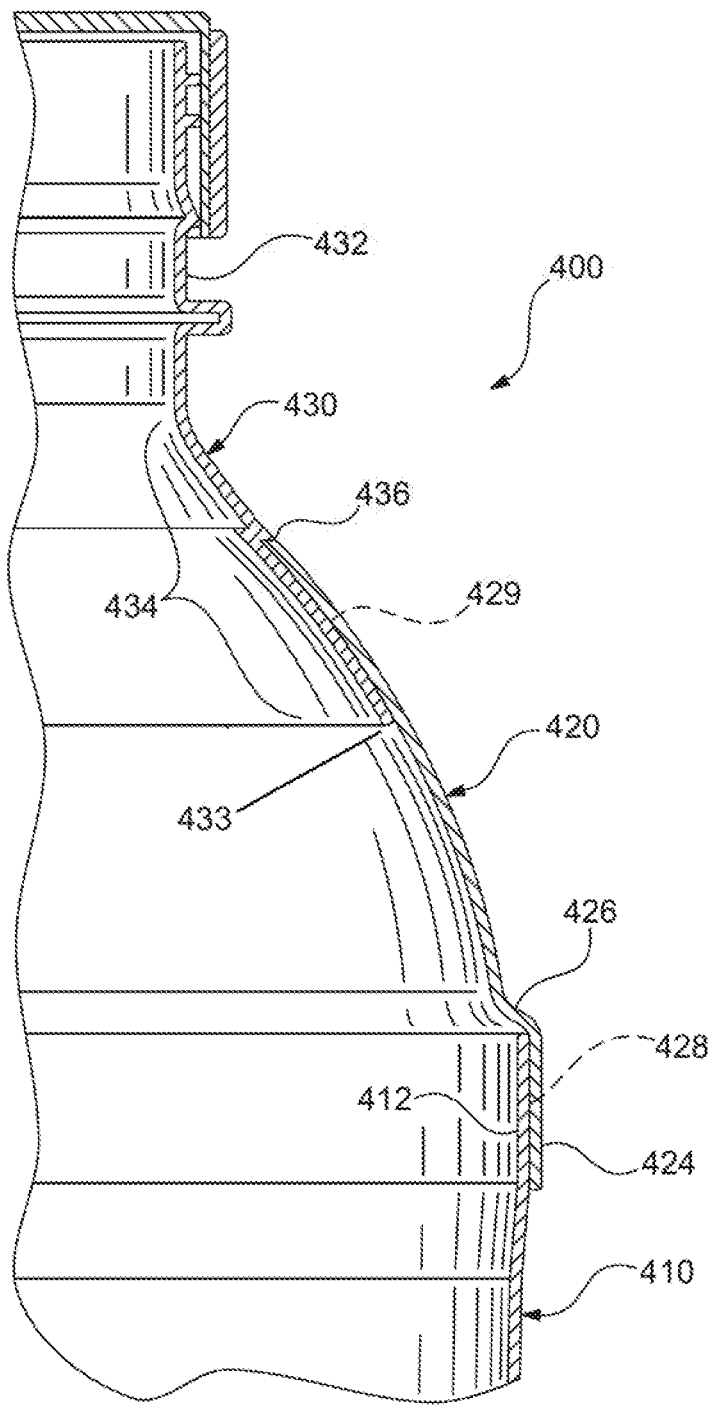
FIG. 7 is a view of half of a cross section of the top of the bottle of FIG. 4 taken along a line A-A illustrated in FIG. 4, in accordance with an exemplary embodiment of the present invention.

As seen in FIG. 7, the pulp shoulder 420 further comprises a substantially vertical (in cross section) lip 424 at its bottom, as well as a nearly horizontal (in cross section) shelf 426 between the lip 424 and the adjacent portion of the pulp shoulder 420. The lip 424 has a larger circumference that the adjacent portion of the pulp shoulder 420 and creates a flanged mating section. The shelf 426 is defined by the difference in circumference between the lip 424 and the adjacent portion of the pulp shoulder 420. The inner circumference of the pulp shoulder 420 at the lip 426 fits over the outer surface of the top 412 of the pulp body 410, such that the outer surface of the pulp body 410 is adjacent to, and in contact with, the inner surface of the lip 424. The pulp body 410, therefore, abuts the horizontal shelf 426.

In one exemplary embodiment of the bottle 400, the pulp body 410 and pulp shoulder 420 are attached using an adhesive 428, such as known to one skilled in the art. In another exemplary embodiment, they are attached using a heat sealing technique described herein. As set forth below, the adhesive is desirable a polymer that is not soluble in water but is biodegradable and repulpable, thereby allowing the bottle to be recycled in the paper stream. In such an embodiment, the fill line of liquid contents may be above the bonding line, the point at which the pulp shoulder 420 is bonded to the pulp body 410. A label may be placed over the mating of the pulp shoulder 420 with the pulp body 410 around a complete circumference of the bottle 400 or 400'.

Figure 8:
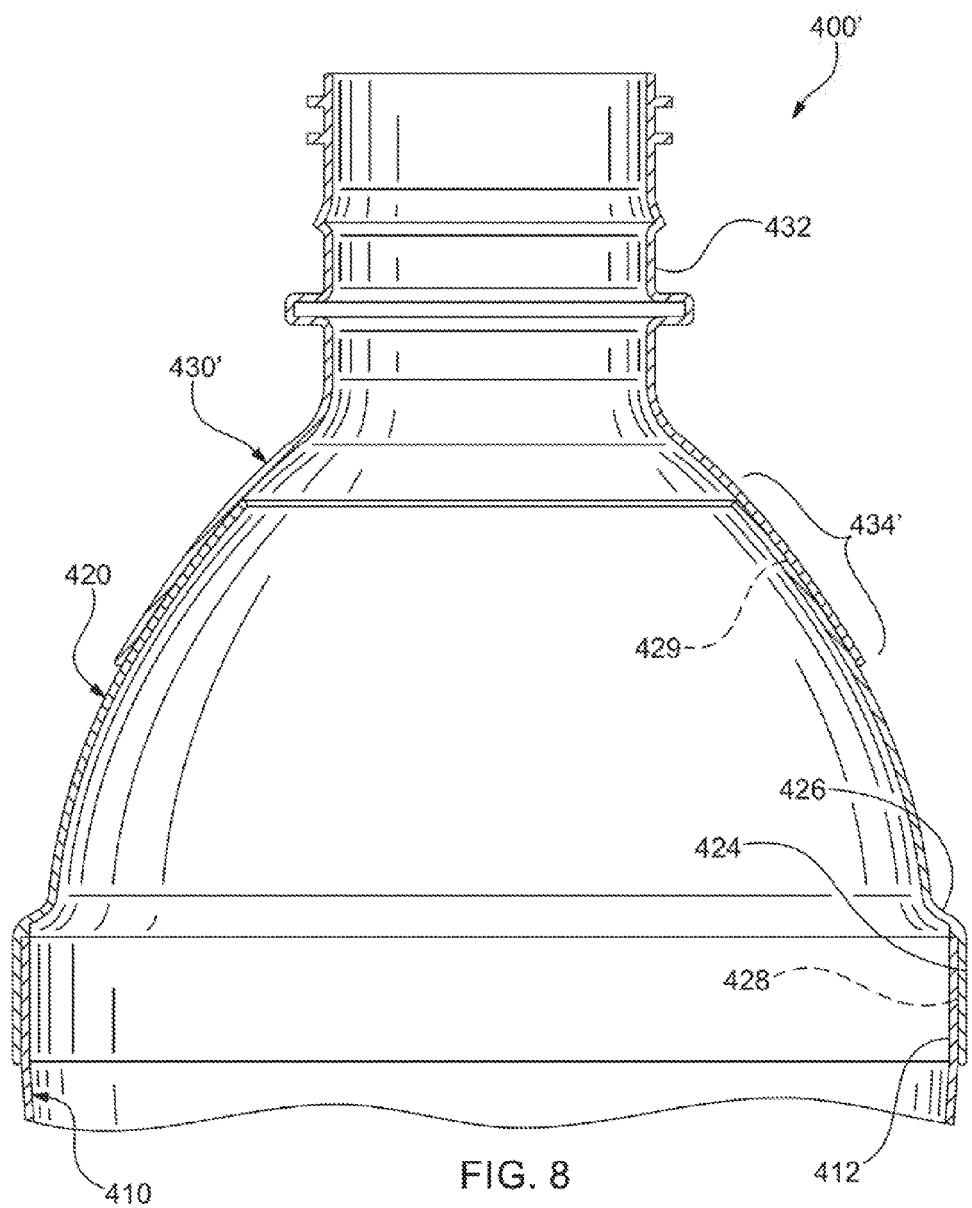
FIG. 8 is view of a cross section of a top of another embodiment of a bottle taken along a line similar to the line A-A illustrated in FIG. 4, in accordance with an exemplary embodiment of the present invention.

Referring now to FIG. 8, there is illustrated yet another exemplary embodiment of a bottle, generally designated as 400', in accordance with an exemplary embodiment of the present invention. The bottle 400' includes many of the same elements of features of the bottle 400 but differs in a few respects. The neck portion, generally designated as 430, of the bottle 400' differs from the neck portion 430 of the bottle 400 in that the lower dome-like portion, generally designated as 434' lacks the ridge 436. The lack of the ridge 436 is the result of the fact that the neck portion 430' is fitted over the top of the outside surface of the shoulder 420, as shown in FIG. 8.

Figure 12:
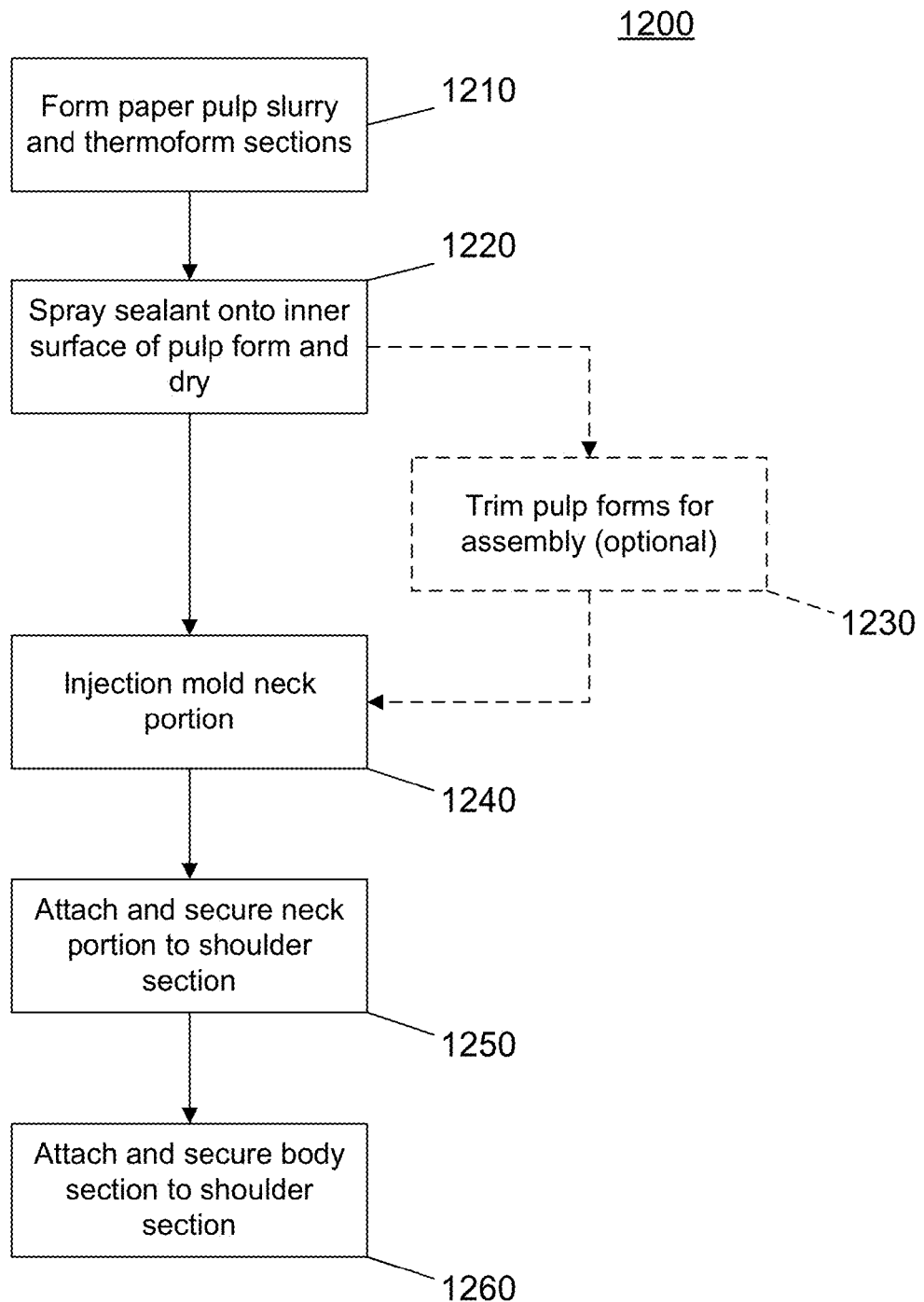
FIG. 12 illustrates exemplary steps of a method of manufacturing a bottle, in accordance with an exemplary embodiment of the present invention.

A method of manufacturing the bottle 400 or 400' is now described, in accordance with an exemplary embodiment of the present invention. FIG. 12 illustrates exemplary steps 1210 through 1260 of a method 1200 for manufacturing the bottle 400 or 400', in accordance with an exemplary embodiment of the present invention. The method begins with forming the pulp body 410 and pulp shoulder 420 by thermoforming a paper pulp slurry, Step 1210. After the pulp body 410 and pulp shoulder 420 are thermoformed, they are conveyed to a coating machine that sprays a sealant onto the cavity side (inner surfaces) of the pulp sections, Step 1220. The purpose of this coating is to create a barrier between the liquid and the pulp. This sealant could be from the family of polyvinyl alcohol (PVA) polymers, or a bioplastic (that can be sprayed), or any other interior sealing coating known to one skilled in the art. The spray coating is then dried in the Step 1220. In an exemplary embodiment of the method 1200, after the pulp body 410 and pulp shoulder 420 are spray coated and dried in the Step 1220, the pulp sections may be trimmed at their perimeter in an option Step 1230. The method 1200 then proceeds to a Step 1240. If the Step 1230 is bypassed, the method 1200 passes directly from the Step 1220 to the Step 1240.

The bioplastic neck portion 430 or 430' is injection molded from a bioresin material known to one skilled in the art, Step 1240. In an exemplary embodiment, the bioresin is polylactic acid (PLA). The bioplastic neck portion 430 or 430' is then attached to the pulp shoulder 420, Step 1250. In an exemplary embodiment of the Step 1250, the bioplastic neck portion 430 or 430' is bonded to the pulp shoulder 420 using an adhesive 429 known to one skilled in the art. The adhesive 429 is desirably a polymer that is not soluble in water, but is biodegradable and repulpable, allowing the bottle to be recycled in the paper stream. With respect to the bottle 400, the adhesive material 429 (illustrated in FIG. 7) is applied to the outer surface of the bioplastic neck portion 430 and the neck portion 430 is then joined together with the inner surface of the pulp shoulder 420. With respect to the bottle 400', the adhesive material 429 (illustrated in FIG. 8) may be applied to the inner surface of the bioplastic neck portion 430' and then joined together with the outer surface of the pulp shoulder 420.

In another exemplary embodiment of the Step 1250, the bioplastic neck portion 430 or 430' is secured to the pulp shoulder 420 through a heat sealing process. The bioplastic neck portion 430 or 430' and the pulp shoulder 420 are inserted into a purpose-built jig. Heated press tools are then closed on the mating surfaces, and, through pressure and heat, the bioplastic neck portion 430 or 430' is adhered to the pulp shoulder 420. Alternatively, if the bioplastic neck portion 430 or 430' does not have properties that allow for heat sealing, a heat activated adhesive may be introduced on one of the mating surfaces before pressing.

Following the Step 1250, the pulp shoulder 420 is attached and secured to the pulp body 410, Step 1260. In the Step 1260, the pulp shoulder 420 may be attached to the pulp body by an adhesive 428. Although FIG. 12 illustrates that the Step 1250 is performed after the Step 1240, it is to be understood that the order of these two steps may be switched in alternative exemplary embodiments. Additionally, although FIG. 12 illustrates that the Step 1220 is performed before the Steps 1240 through 1260, alternative exemplary embodiments of the method 1200 in which the Step 1220 is performed after the Steps 1240 through 1260 are contemplated. In such an embodiment, the inner surface of the assembled bottle 400 or 400' is spray coated with a sealant. This sealant could be from the family of polyvinyl alcohol (PVA) polymers, or a bioplastic (that can be sprayed), or any other interior sealing coating known to one skilled in the art.

Figure 13:
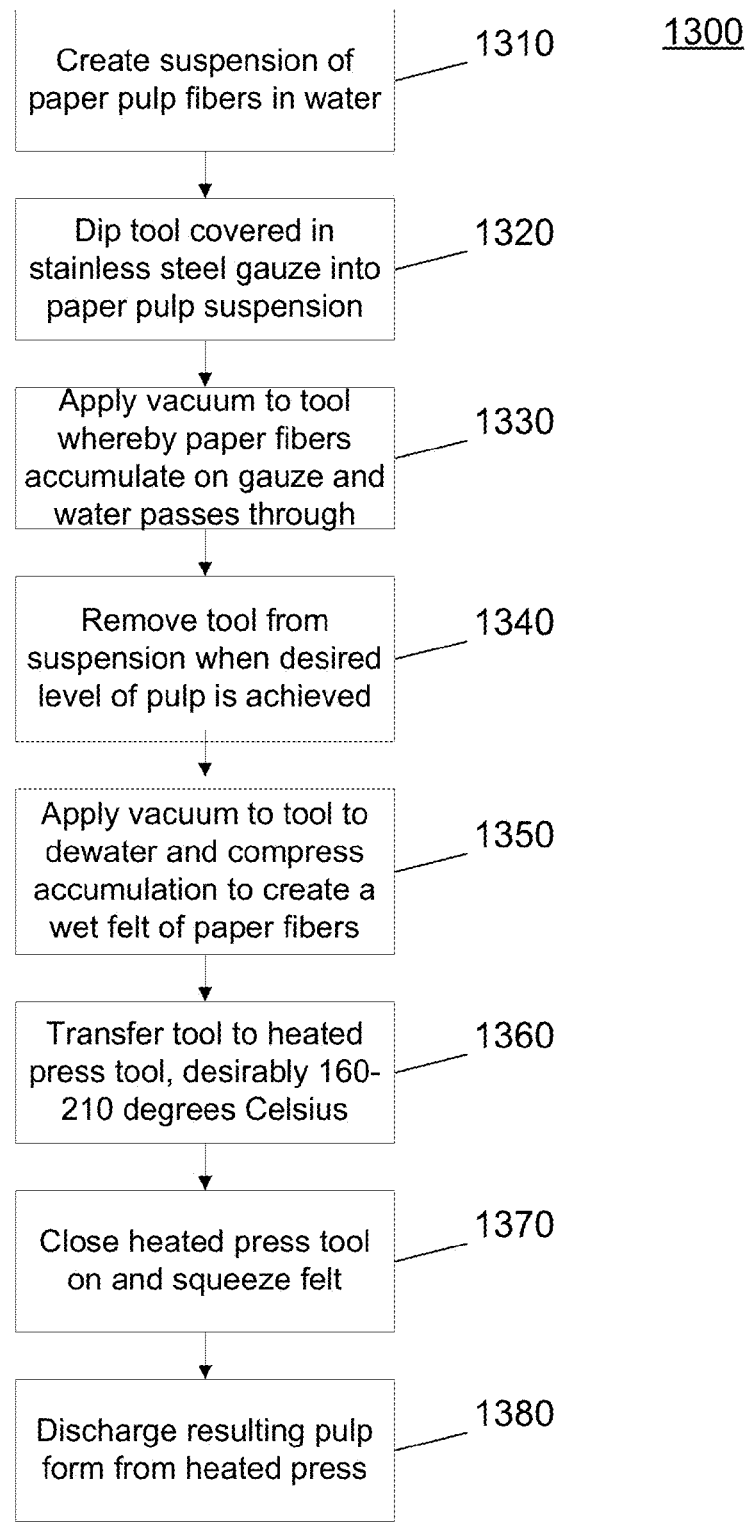
FIG. 13 illustrates exemplary steps of a method of thermoforming a bottle, in accordance with an exemplary embodiment of the present invention.

Referring now to FIG. 13, there are illustrated exemplary Steps 1310 though 1380 of a method 1300 of thermoforming performed in the Step 1210 of the method 1200, in accordance with an exemplary embodiment of the present invention. The method 1200 of thermoforming involves creating a suspension of paper pulp fibers in water, Step 1310, and dipping a tool covered in stainless steel gauze into the suspension of paper pulp fibers, Step 1320. A vacuum is applied to the tool and the gauze begins to develop an accumulation of paper fibers while the water passes through the gauze, Step 1330. Once the desired level of pulp is achieved on the gauze, the tool is removed from the suspension, Step 1340. The vacuum is again applied to the tool causing the accumulation to dewater and compress, thereby creating a wet felt of paper fibers on the tool, Step 1350. The suspension of pulp fibers comprises paper, a sizing agent and/or a wet strength agent that could be any combination of, or exclusively a rosin of, a wax emulsion, alkyl ketene dimer (AKD), or polyamide-epichlorohydrin (PAE). Additionally, aluminum sulfate, polyaluminum chloride (PAC), or a polymer based additive may be used for flocculation, drainage and in the instance of PAC and the polymer based additive, retention.

The felt is then transferred using a transfer tool (which is the inverse shape of the molding tool) to a heated press tool, desirably heated to 160-210 degrees Celsius, Step 1360. This press tool then closes on another heated press tool effectively squeezing the felt, Step 1370. Due to the pressure of the press tools and the heat being applied, the felt dries into a pulp form approximately 1 mm thick that is high in tolerance and has a smooth surface texture. The upper press tool then discharges the form from the thermoforming machine, Step 1380.

Figure 9:
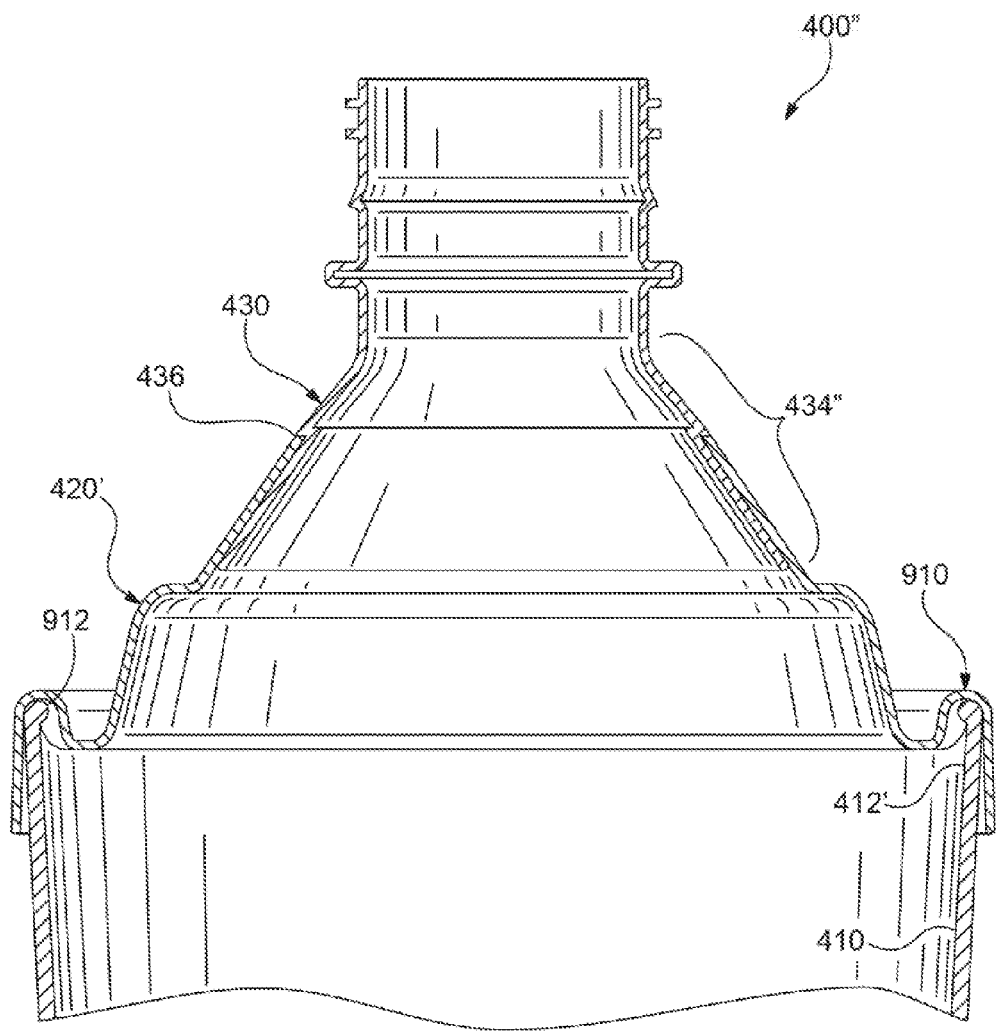
FIG. 9 is another view of cross section of a top of another embodiment of a bottle, in accordance with an exemplary embodiment of the present invention.

FIG. 9 shows yet another exemplary alternative embodiment of the bottle 400, generally designated as 400", in accordance with an exemplary embodiment of the present invention. The pulp shoulder of the bottle 400", generally designated as 420", differs from the pulp shoulder 420 of the bottle 400 in how it is attached to the pulp body 410. The bottom of pulp shoulder 420" comprises an S-shaped (in cross section) portion 910 that forms a channel 912 for receiving the top 412 of the pulp body 410. In another exemplary embodiment, the top 412 of the pulp body 412 may include a channel, similar to the channel 912, for receiving the bottom of the pulp shoulder 420. In such an embodiment, once the adhesive is applied inside the pulp shoulder channel 412, the pulp body 410 would be inserted into the pulp shoulder channel 412, causing the top edge of the pulp body 410 to positively locate in the pulp shoulder channel 412 and thus bond the sections together.

Figure 10:
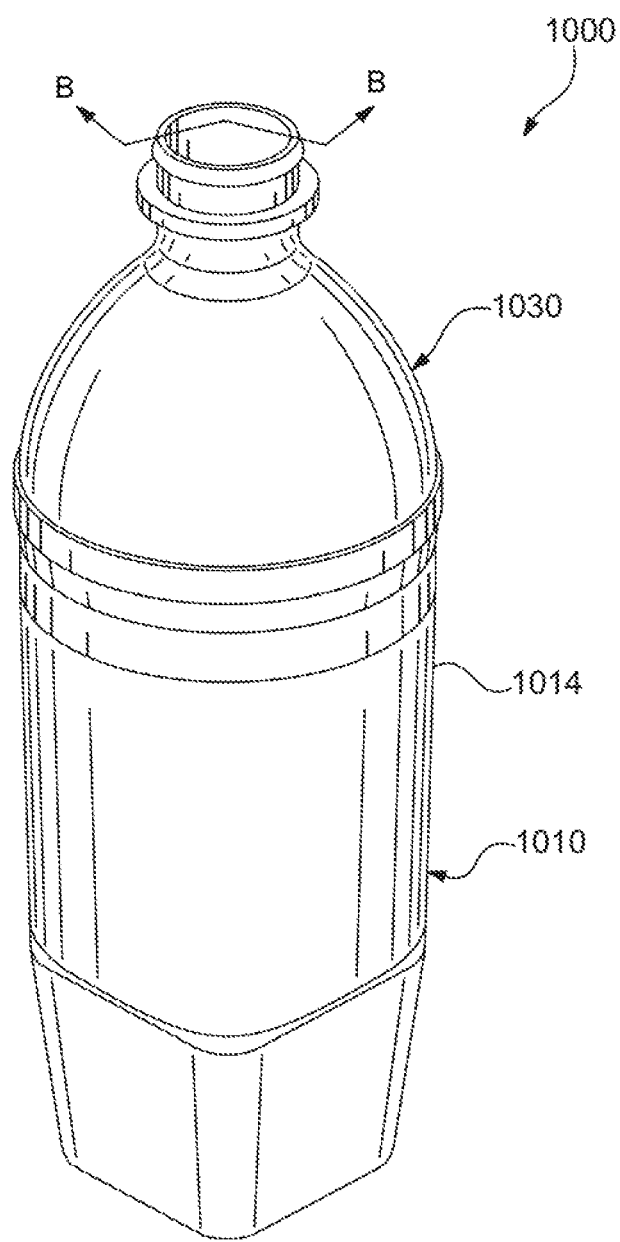
FIG. 10 is a perspective view of yet another embodiment of a bottle, in accordance with an exemplary embodiment of the present invention.
Figure 10A:
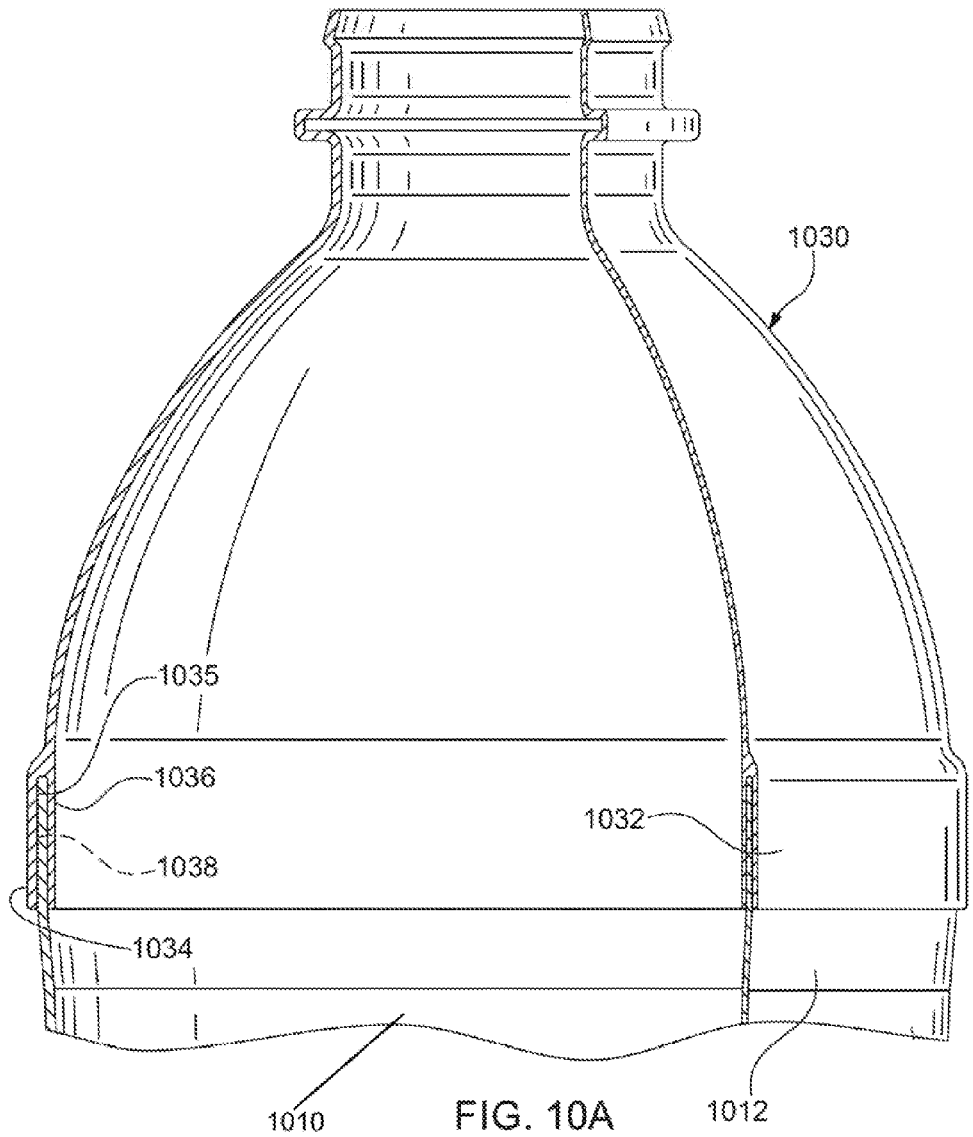
FIG. 10A is a sectional view of a top of the bottle of FIG. 10 taken along lines B-B illustrated in FIG. 10, in accordance with an exemplary embodiment of the present invention.

FIG. 10 shows yet another exemplary embodiment of a bottle, generally designated as 1000, in accordance with an exemplary embodiment of the present invention. The bottle 1000 is constructed in two pieces, a pulp body 1010 and a bioplastic top 1030, instead of three pieces, as previously described herein. FIG. 10A illustrates a section of the bottle 1000 taken at lines B-B illustrated in FIG. 10.

Referring to FIGS. 10 and 10A, the pulp body 1010 may be similar to the pulp body 410 of the bottle 400, and the top 1030 may be similar to the shoulder 420 and the neck portion 430 if they were to be formed from one piece in a bioplastic. In a first exemplary embodiment, the tall, outwardly drafted pulp body 1010 is directly bonded to the bioplastic top 1030 by an adhesive 1038. The bioplastic top 1030 is one piece and functions as the shoulder 420 and neck portion 430.

As shown in FIG. 10A, a bottom circumference 1032 of the bioplastic top 1030 splits into two vertically aligned edges 1034 and 1036, the interior of which forms a channel 1035. To assemble, the adhesive 1038 may be applied in the channel 1035, so that upon insertion of the top edge 1012 of the pulp body 1010 into the channel 1035, the bioplastic top 1030 and the pulp body 1010 will be joined. The vertically aligned edges 1034 and 1036 are adjacent to the inner and outer surface of the top 1012 of the pulp body 1010. The fill line of the bottle 1000 for liquid contents may be above the bonding line of the bottle 1000, which line is at which the bioplastic top 1030 and the pulp body 1010 are joined. Additionally, the pulp body 1010 may comprise a smooth outer surface 1014 for applying a label.

Figure 11:
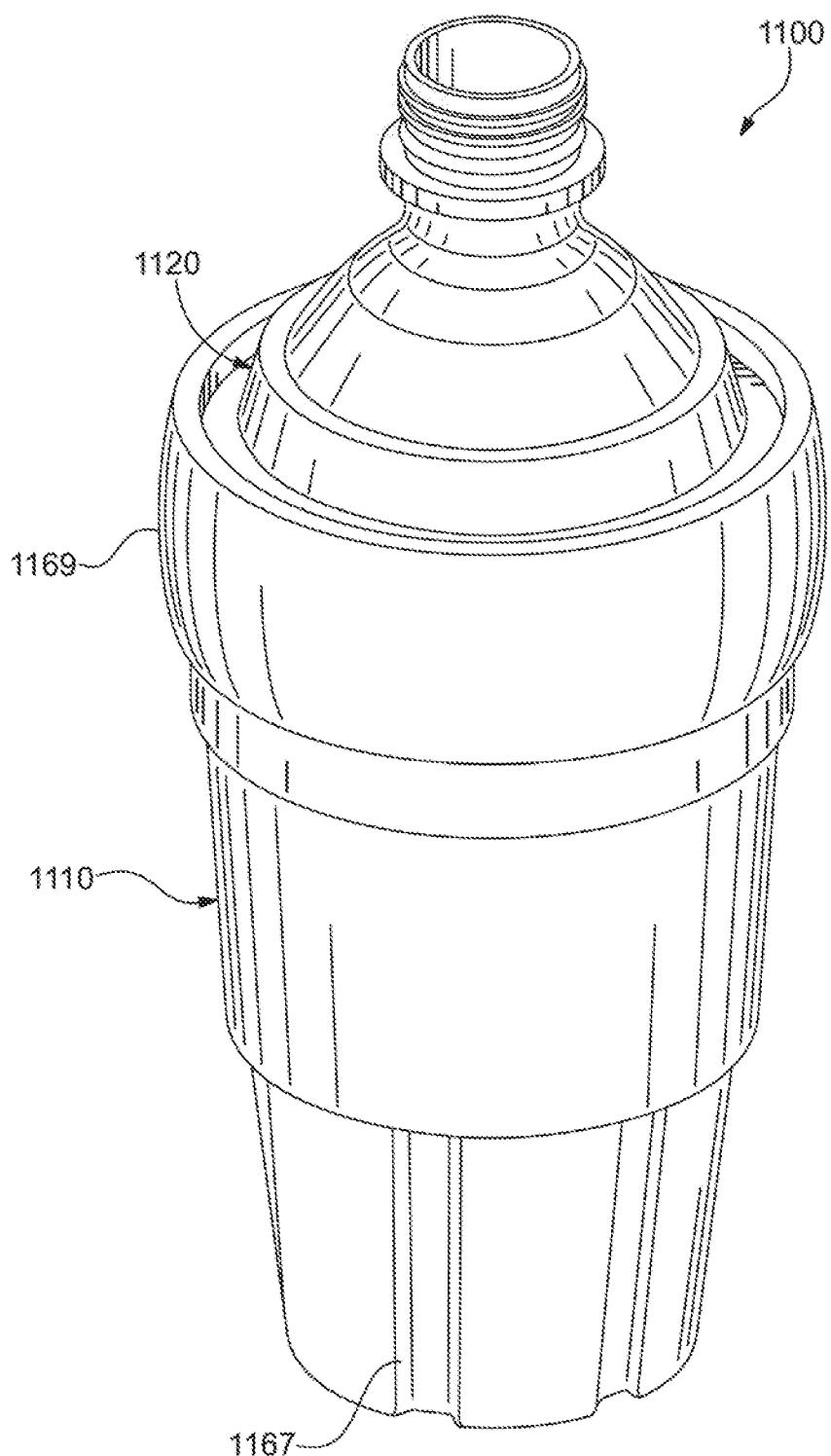
FIG. 11 is a perspective view of still another exemplary embodiment of a bottle, in accordance with an exemplary embodiment of the present invention.

In any of the foregoing embodiments, the body of the bottle or portions of the body of the bottle may also be made of a bioplastic material, as opposed to a pulp material. Further, the neck portion or portions of the neck portion may be made of pulp. Referring now to FIG. 11, there is illustrated an exemplary embodiment of a bottle, generally designated as 1100, in accordance with an exemplary embodiment of the present invention. The bottle 1100 comprises a body 1110 that is formed from a bioplastic material. Otherwise, the bottle 1100 may be constructed similarly to the bottles 400, 400', or 400", with additional features as described below. It is to be understood that, in exemplary alternative embodiments, portions of the body 1110 may be made from pulp, for example the bottom of the body 1110.

The body 1110 comprises a plurality of vertically aligned base creases 1167 that provide additional structural support to the body 1110. The body 1110 may have a surface area 1169 to apply a label, which may serve to conceal any visible lines where the pieces of the bottle are joined. It is to be understood that other embodiments of the bottle 1110 in which the creases 1167 are ridges are contemplated or that any of the creases 1167 or ridges 1167 may be horizontal or circumferentially disposed about the body 1110. Further, it is contemplated that radial or concentric creases or grooves may be disposed on a shoulder 1120 of the bottle 1100, which shoulder 1120 corresponds to the pulp shoulder 420 of the bottle 400.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A liquid containing apparatus, comprising:
   a pulp body;
   a pulp shoulder comprising an outer surface and an inner surface; and a bioplastic neck portion comprising an outer surface and an inner surface, wherein the bioplastic neck mates with the pulp shoulder, and the pulp shoulder mates with the pulp body, wherein the pulp shoulder further comprises an opening at its top, and wherein the bioplastic neck portion further comprises a ridge along the outer surface of the bioplastic neck portion, wherein the pulp shoulder resides over at least a portion of the bioplastic neck portion below the ridge along the outer surface of the bioplastic neck portion.

2. The liquid containing apparatus of claim 1, wherein a top edge of the pulp shoulder abuts against the ridge so that an exterior of the liquid containing apparatus about the ridge is smooth.

3. The liquid containing apparatus of claim 1, wherein the pulp shoulder further comprises a vertical lip and a horizontal shelf, the vertical lip comprising an inner surface, and wherein a top of the pulp body is adjacent to and in contact with the inner surface of the vertical lip and the horizontal shelf when the pulp body is secured to the pulp shoulder.

4. The liquid containing apparatus of claim 3, further comprising an adhesive applied to the inner surface of the vertical lip to secure the pulp shoulder with the pulp body.

5. The liquid containing apparatus of claim 3, further comprising a label applied over the mating of the pulp shoulder with the pulp body around a complete circumference of the liquid containing apparatus.

6. The liquid containing apparatus of claim 5, wherein the label is adhered to an exterior of the lip and an upper exterior portion of the lower pulp body below the vertical lip of the pulp shoulder.

7. The liquid containing apparatus of claim 1, wherein the pulp body and the pulp shoulder each further comprises an interior sealing coating.

8. The liquid containing apparatus of claim 1, wherein the pulp body includes one or more vertical strengthening creases.

9. The liquid containing apparatus of claim 1, wherein the pulp body further comprises one or more vertical strengthening ribs.

10. The liquid containing apparatus of claim 1, wherein the pulp shoulder further comprises one or more radial strengthening creases.

11. The liquid containing apparatus of claim 1, wherein the pulp body and the pulp shoulder each comprise an interior sealing coating.

12. The liquid containing apparatus of claim 11, wherein the interior sealing coting of each of the pulp body and the pulp shoulder is formed from a polyvinyl alcohol polymer.

13. The liquid containing apparatus of claim 11, wherein the interior sealing coating of each of the pulp body and the pulp shoulder is formed from a bioplastic.

14. A liquid containing apparatus, comprising:
a pulp body;
a pulp shoulder comprising an outer surface and an inner surface; and
a bioplastic neck portion comprising an outer surface and an inner surface,
wherein the bioplastic neck mates with the pulp shoulder, and the pulp shoulder mates with the pulp body,
wherein the pulp shoulder further comprises an opening at its top,
wherein the pulp shoulder is disposed over at least a portion of the bioplastic neck portion,
wherein the bioplastic neck portion further comprises a bioplastic neck that extends through the opening of the pulp shoulder, and
wherein the bioplastic neck portion is secured to the pulp shoulder by way of at least one of:
a heat seal formed between at least a portion of the outer surface of the bioplastic neck portion and at least a portion of the inner surface of the pulp shoulder; and
an adhesive applied between at least a portion of the outer surface of the bioplastic neck portion and at least a portion of the inner surface of the pulp shoulder portion.

15. A liquid containing apparatus, comprising:
a pulp body;
a pulp shoulder comprising an outer surface and an inner surface; and
a bioplastic neck portion comprising an outer surface and an inner surface,
wherein the bioplastic neck mates with the pulp shoulder, and the pulp shoulder mates with the pulp body, and
wherein the bioplastic neck portion is secured to the pulp shoulder by way of at least one of:
a heat seal formed between at least a portion of the inner surface of the bioplastic neck portion and at least a portion of the outer surface of the pulp shoulder; and
adhesive applied between at least a portion of the inner surface of the pulp shoulder and at least a portion of the outer surface of the bioplastic neck portion.

16. A method of manufacturing a container for liquids, comprising:
thermoforming a pulp body;
thermoforming a pulp shoulder comprising a shoulder outer surface and a shoulder inner surface;
injection molding a neck portion with a bioplastic, the bioplastic neck portion comprising a neck outer surface and a neck inner surface;
attaching the pulp shoulder to the bioplastic neck portion so that the bioplastic neck portion mates with the pulp shoulder; and
attaching the pulp shoulder to the pulp body so that the pulp shoulder mats with the pulp body,
wherein the bioplastic neck portion is secured to the pulp shoulder by way of at least one of:
a heat seal formed between at least a portion of the neck inner surface and at least a portion of the shoulder outer surface; and
an adhesive applied between at least a portion of the shoulder inner surface and at least a portion of neck outer surface.

* * * * *